F. O. JAQUES, Jr.
NUT LOCK.
APPLICATION FILED FEB. 9, 1911.
998,905.
Patented July 25, 1911.
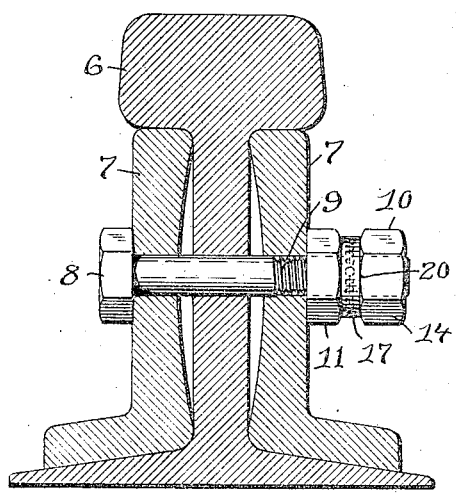
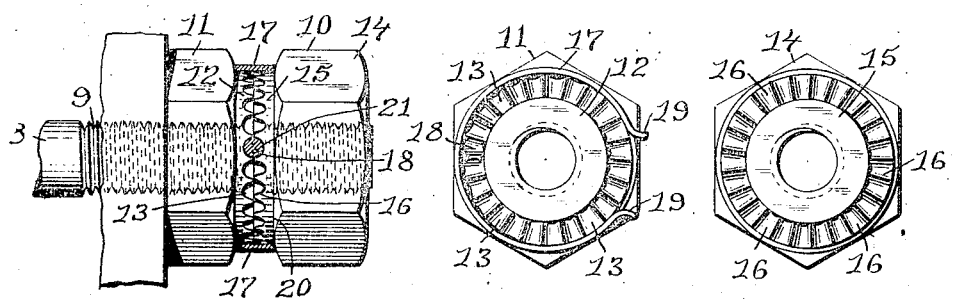
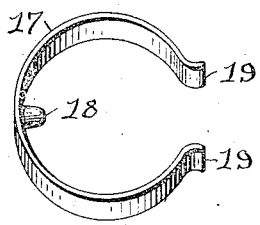
WITNESSES:
Julia Ricci
Harry G. Jones
INVENTOR:
Fernando Oscar Jaques Jr.
by Chas. H. Luther
ATTORNEY.

UNITED STATES PATENT OFFICE.

FERNANDO OSCAR JAQUES, JR., OF CRANSTON, RHODE ISLAND, ASSIGNOR, BY DIRECT AND MESNE ASSIGNMENTS, TO THE UNITED STATES PATENTED INVENTIONS CO., OF PROVIDENCE, RHODE ISLAND, A CORPORATION OF RHODE ISLAND.

NUT-LOCK.

998,905.      Specification of Letters Patent.      Patented July 25, 1911.

Application filed February 9, 1911. Serial No. 607,613.

*To all whom it may concern:*

Be it known that I, FERNANDO OSCAR JAQUES, Jr., a citizen of the United States, residing at Cranston, in the county of Providence and State of Rhode Island, have invented a new and useful Improvement in Nut-Locks, of which the following is a specification.

This invention has reference to an improvement in nut locks, and more particularly to that class of nut locks in which is employed a bolt with right or left hand screw-threads and two nuts engaging with the screw-threads and means for locking the two nuts against retrograde movement.

The object of my invention is to improve the construction of a nut lock, whereby the nuts are positively locked in any position they may assume relative to each other.

Another object of my invention is to simplify the construction of a nut lock, whereby only one member is required in addition to the nuts.

My invention consists in the peculiar and novel construction of a nut lock, comprising a screw-threaded member, a nut member having an even number of notches, a nut member having an odd number of notches and a locking-member, as will be more fully set forth hereinafter and claimed.

Figure 1. is a vertical transverse sectional view through a rail and fish-plate, showing a bolt with my improved nut lock applied thereto. Fig. 2. is an enlarged side view of the nut lock, with the locking ring in section and the greater portion of the fish-plate and bolt broken away. Fig. 3. is a face view of the inner nut having twenty-four notches and showing the locking ring in position on the nut. Fig. 4. is a face view of the outer nut having twenty five notches, and Fig. 5. is a perspective view of the locking ring.

In the drawings 6. indicates a rail, 7. 7. fish-plates, 8. a bolt having the usual screw-threads 9., and 10. my improved nut lock. The rail 6. and fish-plates 7. 7. are shown only to illustrate a device to which my improved nut lock may be practically applied.

The nut lock 10. consists of an internal screw-threaded inner nut 11. having a concentric circular raised face 12. in which, at the periphery, is a continuous series of twenty-four tapered semi-circular radial notches 13. 13. which extend in from the circular edge a predetermined distance, an internal screw-threaded outer nut 14. having a concentric circular raised face 15. in which at the periphery, is a continuous series of twenty-five tapered semi-circular radial notches 16. 16. which extend in from the circular edge a predetermined distance, and a spring locking ring 17. having a round tapered pin 18. and the outwardly turned ends 19. 19. The raised circular faces 12. and 15. form cylindrical side portions in which the notches in each face are in juxtaposition and when the nuts are together, a circumferential groove 20. is formed as shown in Figs. 2. and 3. for the locking band 17.

When in use the inner nut 11. is screwed up on the bolt 8. against the fish-plate 7. to its limit, with the face 12. of the nut outward. The outer nut 14. is then screwed up on the bolt 8. to its limit, with the face 15. against the face 12. of the inner nut 11. By having a continuous odd number of tapered notches such as 25. on one nut and a continuous even number of tapered notches such as 24. on the other nut, there is always a point where two oppositely disposed semi-circular tapered notches will coincide and form a circular tapered hole 21., as shown in Fig. 2. which extends in from the periphery of the raised faces. By having a continuous odd number of tapered notches, such as 25. in one face in a circle and a continuous even number of tapered notches, such as 24. in the opposite face, in a circle there is always a tapered hole 21. formed by two coinciding notches in any relative position the nuts may assume on the principle of a vernier scale. The spring locking band 17. is then forced over and into the groove 21. and turned until the tapered pin 18. enters the tapered hole 21. where it is held in position by the band or other means so that the nuts are positively locked. The nuts cannot be unlocked without removing the pin and locking band from the nuts.

It is evident that the number of even and odd notches could vary one notch for each nut as follows, 23—24, 22—23, 25—26, 26—27, etc., and that any means could be used for detachably securing the pin 18. in the hole 21. without materially affecting the spirit of my invention.

Having thus described my invention, I claim as new and desire to secure by Letters-Patent—

1. A nut lock, comprising an external screw-threaded member, an internal screw-threaded member having a continuous even number such as 24. of radial tapered notches in juxtaposition, an internal screw-threaded member having a continuous odd number such as 25. of radial tapered notches in juxtaposition, and means adapted to enter a radial tapered hole formed by two coinciding radial tapered notches and lock the internal screw-threaded members against a retrograde movement.

2. A nut lock, comprising an external screw-threaded member, a nut engaging the threads of the external screw-threaded member and having a continuous series of radial tapered notches in juxtaposition, said notches being of an even number such as 24., a nut engaging the threads of the external screw-threaded member and having a continuous series of radial tapered notches in juxtaposition, said notches being of an odd number such as 25., a tapered locking pin adapted to enter a radial tapered hole formed by two coinciding radial tapered notches, and means for detachably securing the tapered locking pin in position.

3. A nut lock, comprising an external screw-threaded member, two nuts engaging the threads of the external screw-threaded member, each nut having a circular raised opposing face, one nut having a continuous even number of radial tapered notches such as 24. in juxtaposition in its face, the other nut having a continuous odd number of radial tapered notches such as 25., in juxtaposition in its face, a tapered locking pin adapted to enter a radial tapered hole formed by two coinciding tapered notches and means for detachably securing the tapered locking pin in the radial tapered hole.

4. A nut lock, comprising an external screw-threaded member, two nuts engaging the threads of the external screw-threaded member, each nut having a circular raised opposing face, forming cylindrical side portions and an annular groove, one nut having a continuous even number of radial tapered notches such as 24. in juxtaposition in its raised face, and the other nut having a continuous odd number of radial tapered notches such as 25. in juxtaposition in its raised face, a spring band in the annular groove and a tapered locking pin on the spring band, said tapered locking pin entering a radial tapered hole formed by two coinciding tapered notches in the opposing faces.

5. A nut lock, comprising a screw-threaded bolt, two nuts engaging the threads on the bolt, each nut having a circular raised opposing face, one nut having twenty four continuous semi-circular radial tapered notches in juxtaposition in its raised face, and the other nut having twenty-five continuous semi-circular radial tapered notches in juxtaposition in its raised face, cylindrical side portions and an annular groove formed by the raised faces on the nuts, a spring band in the annular groove and a round tapered locking pin on the spring band, said round tapered locking pin entering a round tapered radial hole formed by two coinciding semi-circular tapered notches in the opposing faces.

In testimony whereof, I have signed my name to this specification in the presence of two subscribing witnesses.

FERNANDO OSCAR JAQUES, Jr.

Witnesses:
ARTHUR P. MOWRY,
CHAS. H. LUTHER.